US011518089B2

(12) United States Patent
Wright et al.

(10) Patent No.: US 11,518,089 B2
(45) Date of Patent: Dec. 6, 2022

(54) LOW VISCOSITY DUAL CURE ADDITIVE MANUFACTURING RESINS

(71) Applicant: Carbon, Inc., Redwood City, CA (US)

(72) Inventors: Andrew Gordon Wright, Mountain View, CA (US); Kai Chen, Sunnyvale, CA (US); Bob E. Feller, San Mateo, CA (US)

(73) Assignee: Carbon, Inc., Redwood City, CA (US)

( * ) Notice: Subject to any disclaimer, the term of this patent is extended or adjusted under 35 U.S.C. 154(b) by 0 days.

(21) Appl. No.: 17/606,157

(22) PCT Filed: Apr. 21, 2020

(86) PCT No.: PCT/US2020/029075
§ 371 (c)(1),
(2) Date: Oct. 25, 2021

(87) PCT Pub. No.: WO2020/223058
PCT Pub. Date: Nov. 5, 2020

(65) Prior Publication Data
US 2022/0143904 A1 May 12, 2022

Related U.S. Application Data

(60) Provisional application No. 62/840,567, filed on Apr. 30, 2019, provisional application No. 62/875,819, filed on Jul. 18, 2019, provisional application No. 62/903,022, filed on Sep. 20, 2019.

(51) Int. Cl.
| | |
|---|---|
| *B29C 35/08* | (2006.01) |
| *H05B 6/00* | (2006.01) |
| *H05B 7/00* | (2006.01) |
| *B29C 45/14* | (2006.01) |
| *C08F 2/46* | (2006.01) |
| *C08F 2/50* | (2006.01) |
| *C08G 61/04* | (2006.01) |
| *B29C 64/129* | (2017.01) |
| *B29C 64/165* | (2017.01) |
| *C08F 222/10* | (2006.01) |
| *C08F 2/48* | (2006.01) |
| *C08F 220/34* | (2006.01) |
| *C08G 18/48* | (2006.01) |
| *C08G 18/67* | (2006.01) |
| *C08G 18/75* | (2006.01) |
| *C08G 65/08* | (2006.01) |
| *C08J 3/24* | (2006.01) |
| *C08J 3/28* | (2006.01) |
| *C08K 3/22* | (2006.01) |
| *C08K 5/06* | (2006.01) |
| *C08K 5/10* | (2006.01) |
| *C08K 5/17* | (2006.01) |
| *B33Y 10/00* | (2015.01) |
| *B33Y 70/00* | (2020.01) |
| *B33Y 80/00* | (2015.01) |

(52) U.S. Cl.
CPC .......... *B29C 64/129* (2017.08); *B29C 64/165* (2017.08); *C08F 2/48* (2013.01); *C08F 220/34* (2013.01); *C08F 222/102* (2020.02); *C08F 222/103* (2020.02); *C08F 222/1065* (2020.02); *C08G 18/4825* (2013.01); *C08G 18/672* (2013.01); *C08G 18/758* (2013.01); *C08G 65/08* (2013.01); *C08J 3/247* (2013.01); *C08J 3/28* (2013.01); *C08K 3/22* (2013.01); *C08K 5/06* (2013.01); *C08K 5/10* (2013.01); *C08K 5/17* (2013.01); *B33Y 10/00* (2014.12); *B33Y 70/00* (2014.12); *B33Y 80/00* (2014.12); *C08J 2333/14* (2013.01); *C08J 2371/02* (2013.01); *C08J 2375/16* (2013.01); *C08K 2003/2241* (2013.01)

(58) Field of Classification Search
CPC ... C08F 2/46; C08F 2/50; B29C 35/02; B29C 45/14; H05B 6/00; H05B 7/00; C08G 61/04
USPC .... 264/405, 275, 271, 259, 241, 239; 522/6, 522/71, 189, 184, 1; 520/1
See application file for complete search history.

(56) References Cited

U.S. PATENT DOCUMENTS

| | | | |
|---|---|---|---|
| 5,220,796 A | 6/1993 | Kearns | |
| 5,236,637 A | 8/1993 | Hull | |
| 5,391,072 A | 2/1995 | Lawton et al. | |
| 5,529,473 A | 6/1996 | Lawton et al. | |
| 7,438,846 B2 | 10/2008 | John | |
| 7,718,109 B2 | 5/2010 | Robb et al. | |
| 7,892,474 B2 | 2/2011 | Shkolnik et al. | |

(Continued)

FOREIGN PATENT DOCUMENTS

| | | | |
|---|---|---|---|
| WO | 2017079502 A1 | 5/2017 | |
| WO | WO-2017079502 A1 * | 5/2017 | ........... B29C 64/129 |

(Continued)

OTHER PUBLICATIONS

International Search Report and Written Opinion corresponding to PCT/US2020/029075; dated Jul. 31, 2020 (11 pages).

(Continued)

*Primary Examiner* — Jessica Whiteley
(74) *Attorney, Agent, or Firm* — Myers Bigel, P.A.

(57) ABSTRACT

Provided herein according to some embodiments is a dual cure additive manufacturing resin, comprising: (i) a light polymerizable component, (ii) a photoinitiator, (iii) a heat polymerizable component, and (iv) a non-reactive diluent, which resin is useful for the production of three-dimensional objects by additive manufacturing. Methods of using the same are also provided.

29 Claims, No Drawings

(56) References Cited

U.S. PATENT DOCUMENTS

| | | |
|---|---|---|
| 8,110,135 B2 | 2/2012 | El-Siblani |
| 9,205,601 B2 | 12/2015 | Desimone et al. |
| 9,211,678 B2 | 12/2015 | Desimone et al. |
| 9,216,546 B2 | 12/2015 | Desimone et al. |
| 9,440,216 B2 | 9/2016 | Ryan |
| 9,453,142 B2 | 9/2016 | Rolland et al. |
| 9,598,606 B2 | 3/2017 | Rolland et al. |
| 9,676,963 B2 | 6/2017 | Rolland et al. |
| 10,316,213 B1 | 6/2019 | Arndt et al. |
| 2013/0292862 A1 | 11/2013 | Joyce |
| 2013/0295212 A1 | 11/2013 | Chen et al. |
| 2015/0331402 A1 | 11/2015 | Lin et al. |
| 2015/0360419 A1 | 12/2015 | Willis et al. |
| 2016/0288376 A1 | 10/2016 | Sun et al. |
| 2017/0129167 A1 | 5/2017 | Castanon |
| 2017/0129169 A1 | 5/2017 | Batchelder et al. |
| 2018/0126630 A1 | 5/2018 | Panzer et al. |
| 2018/0243976 A1 | 8/2018 | Feller |
| 2018/0244854 A1 * | 8/2018 | Drazba ................ C08G 77/20 |
| 2018/0290374 A1 | 10/2018 | Willis et al. |

FOREIGN PATENT DOCUMENTS

| | | | |
|---|---|---|---|
| WO | 2017112682 A1 | 6/2017 | |
| WO | 2018094131 A1 | 5/2018 | |
| WO | WO-2019168807 A1 * | 9/2019 | ......... B29B 17/0026 |

OTHER PUBLICATIONS

Written Opinion corresponding to PCT/US2020/029075; dated Feb. 22, 2021 (8 pages).
Januszsiewicz, Rima, et al., "Layerless fabrication with continuous liquid interface production", PNAS, 113, 2016, 11703-11708.
Tumbleston, John R., et al., "Continuous liquid interface production of 3D Objects", Science, 347(6228), 2015, 1349-1352.
First Chinese Office Action corresponding to CN 202080032361.8; dated Jul. 13, 2022 (16 pages, including English translation).

* cited by examiner

LOW VISCOSITY DUAL CURE ADDITIVE MANUFACTURING RESINS

CROSS REFERENCE TO RELATED APPLICATIONS

This application is a 35 U.S.C. § 371 national phase application of International Application Serial No. PCT/US2020/029075, filed Apr. 21, 2020, which claims the benefit of U.S. Provisional Application No. 62/840,567, filed Apr. 30, 2019, U.S. Provisional Application No. 62/875,819, filed Jul. 18, 2019, and U.S. Provisional Application No. 62/903,022, filed Sep. 20, 2019, the disclosures of which are incorporated by reference herein.

FIELD OF THE INVENTION

The present invention generally concerns additive manufacturing, and particularly concerns dual cure resins that provide both enhanced printability and good functional properties in the finished objects.

BACKGROUND OF THE INVENTION

A group of additive manufacturing techniques sometimes referred to as "stereolithography" creates a three-dimensional object by the sequential polymerization of a light polymerizable resin. Such techniques may be "bottom-up" techniques, where light is projected into the resin on the bottom of the growing object through a light transmissive window, or "top-down" techniques, where light is projected onto the resin on top of the growing object, which is then immersed downward into the pool of resin.

The recent introduction of a more rapid stereolithography technique known as continuous liquid interface production (CLIP), coupled with the introduction of "dual cure" resins for additive manufacturing, has expanded the usefulness of stereolithography from prototyping to manufacturing (see, e.g., U.S. Pat. Nos. 9,211,678, 9,205,601, and 9,216,546 to DeSimone et al.; and also in J. Tumbleston, D. Shirvanyants, N. Ermoshkin et al., Continuous liquid interface production of 3D Objects, *Science* 347, 1349-1352 (2015); see also Rolland et al., U.S. Pat. Nos. 9,676,963, 9,453,142 and 9,598,606).

While dual cure additive manufacturing resins can produce objects with functional properties satisfactory for consumer and other end use, they can, however, be highly viscous, resulting in slower production speeds in additive manufacturing processes like CLIP. Accordingly, there is a need for dual cure resins with enhanced printability during the production process, without sacrificing the functional properties of the resulting products.

SUMMARY OF THE INVENTION

Provided herein according to some embodiments is a dual cure additive manufacturing resin, comprising: (i) a light polymerizable component (e.g., from 30 or 50 percent by weight to 80 or 90 percent by weight), (ii) a photoinitiator (e.g., from 0.2 or 0.3 percent by weight to 2 or 4 percent by weight), (iii) a heat polymerizable component (e.g., from 2 or 5 percent by weight to 20 or 25 percent by weight), and (iv) a non-reactive diluent (e.g., from 1, 2, 4, or 6 percent by weight to 20, 60, 80 or 90 percent by weight).

In some embodiments, the non-reactive diluent has a boiling point of from 80 or 100 degrees Centigrade to 250 degrees Centigrade (at standard temperature and pressure).

In some embodiments, the resin has a viscosity of not more than 3500 centipoise, 3000 centipoise, or 2500 centipoise, at 40 degrees Centigrade (e.g., when measured in accordance with the procedure given in Example 3 herein).

In some embodiments, the non-reactive diluent is included in said resin in an amount of from 1 or 5 percent by weight to 10, 15 or 20 percent by weight.

In some embodiments, the non-reactive diluent comprises a glycol ether (e.g., dipropylene glycol monomethyl ether, dipropylene glycol dimethyl ether, dipropylene glycol methyl ether acetate, propylene glycol methyl ether, diethyleneglycol monomethyl ether, ethylene glycol ethyl ether, propylene glycol monomethyl ether, ethylene glycol monobutyl ether acetate, diethylene glycol monobutyl ether, diethylene glycol monobutyl ether acetate, diethylene glycol monoethyl ether acetate, dipropylene glycol butyl ether, etc., including combinations thereof).

In some embodiments, the non-reactive diluent comprises an ester (e.g., butyl acetate, hexyl acetate, octyl acetate, decyl acetate, dodecyl acetate, etc. including combinations thereof).

In some embodiments, the non-reactive diluent comprises an alcohol (e.g., butanol, amyl alcohol, hexanol, 1-octanol, 2-ethylhexanol, decyl alcohol, dodecanol, etc., including combinations thereof).

In some embodiments, the non-reactive diluent comprises N-methyl-2-pyrrolidone, N,N-dimethylformamide, heavy naptha, toluene, xylene, mineral spirits or white spirits, or a combination thereof.

In some embodiments, the non-reactive diluent comprises dipropylene glycol dimethyl ether, dipropylene glycol methyl ether acetate, or a combination thereof.

In some embodiments, the non-reactive diluent has: (i) a boiling point less than 160, 200, or 240 degrees Centigrade at a pressure of one bar; and/or (ii) an autoignition temperature less than 300, 400, or 600 degrees Centigrade (i.e., as measured in accordance with the procedure described in ASTM E659); and/or (iii) a flash point less than 50, 80, 100, or 140 degrees Centigrade as measured by the Pensky-Martens closed cup method (e.g., ASTM D93, EN ISO 2719, or IP 34).

In some embodiments, the light polymerizable component comprises monomers, prepolymers, or both monomers and prepolymers that can be polymerized by exposure to actinic radiation or light.

In some embodiments, the monomers, prepolymers, or monomers and prepolymers of said light polymerizable component comprises reactive end groups selected from the group consisting of acrylates, methacrylates, alpha-olefins, N-vinyls, acrylamides, methacrylamides, styrenics, epoxides, thiols, 1,3-dienes, vinyl halides, acrylonitriles, vinyl esters, maleimides, and vinyl ethers.

In some embodiments, the heat polymerizable component comprises the precursors to a polyurethane, polyurea, a copolymer of a polyurethane and polyurea, a silicone resin, an epoxy resin, a cyanate ester resin, a copolymer of an epoxy and a cyanate ester resin, or a natural rubber.

In some embodiments, the light polymerizable component comprises a reactive blocked monomer, a reactive blocked prepolymer, or a combination thereof.

In some embodiments, the light polymerizable component comprises a polyisocyanate prepolymer blocked by reaction of a polyisocyanate oligomer with an amine (meth)acrylate, alcohol (meth)acrylate, maleimide, or n-vinylformamide monomer blocking agent.

In some embodiments, the heat polymerizable component comprises a polyol and/or polyamine. In some embodiments, the polyol and/or polyamine may be in liquid or solid form, including encapsulated solids or liquids, dissolved in or suspended said resin.

In some embodiments, the resin further comprises at least one, any combination, or all, of: (v) a chain extender; (vi) a reactive diluent; (vii) a pigment or dye; and (viii) a filler.

Also provided is a method of making a three-dimensional (3D) object from a light polymerizable resin, comprising the steps of: (a) providing a dual cure resin as taught herein; (b) producing an intermediate 3D object from said resin by light polymerizing said resin in an additive manufacturing process (e.g., bottom-up or top-down stereolithography); (c) optionally cleaning said intermediate 3D object; and then (d) heating said intermediate 3D object (e.g., to a temperature of from 80 to 250 degrees Centigrade) to volatilize said diluent, polymerize said heat polymerizable component, and produce said three-dimensional object.

In some embodiments, the producing step is carried out by bottom-up stereolithography (e.g., continuous liquid interface production).

In some embodiments, the cleaning step is included (and, for example, is carried out by washing, spinning, wiping, blowing, or a combination thereof).

In some embodiments, the object has: (i) a shore A hardness of at least 60 or 70; (ii) a Young's modulus of at least 15 or 16 MPa, (iii) a percent elongation at break of at least 200 or 250, (iv) an ultimate tensile strength of at least 16, 18 or 20 MPa, or (v) any combination of the foregoing (each of which, for example, as determined in accordance with the procedures given in Example 4 herein).

In some embodiments, the heating step is carried out with said intermediate object in an inert atmosphere.

In some embodiments, the method further includes: (e) concurrently with said heating step, condensing volatilized diluent out of said inert atmosphere in an amount sufficient to reduce the duration of said heating step.

Further provided is a product produced by a process described herein. In some embodiments, the product comprises an open cell lattice (e.g., a strut lattice, a triply periodic surface lattice).

The foregoing and other objects and aspects of the present invention are explained in greater detail in the drawings herein and the specification set forth below. The disclosures of all United States patent references cited herein are to be incorporated herein by reference.

DETAILED DESCRIPTION OF ILLUSTRATIVE EMBODIMENTS

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

As used herein, the term "and/or" includes any and all possible combinations of one or more of the associated listed items, as well as the lack of combinations when interpreted in the alternative ("or").

1. Resins.

Dual cure resins are preferred for carrying out the present invention. Such resins are known and described in, for example, U.S. Pat. Nos. 9,676,963, 9,453,142 and 9,598,606 to Rolland et al., and in U.S. Pat. No. 10,316,213 to Arndt et al., the disclosures of which are incorporated by reference herein in their entirety.

A dual cure additive manufacturing resin as taught herein may include: (i) a light polymerizable component (e.g., from 30 or 50 percent by weight to 80 or 90 percent by weight), (ii) a photoinitiator (e.g., from 0.2 or 0.3 percent by weight to 2 or 4 percent by weight), (iii) a heat polymerizable component (e.g., from 2 or 5 percent by weight to 20 or 25 percent by weight), and (iv) a non-reactive diluent (e.g., from 1, 2, 4, or 6 percent by weight to 20, 60, 80 or 90 percent by weight).

Non-reactive diluents useful in the present invention are, in general, organic liquids that can be polar or nonpolar, and protic or aprotic. The diluents are preferably non-flammable, non-hygroscopic, low odor, and low viscosity.

In some embodiments, the non-reactive diluent has a boiling point of from 80 or 100 degrees Centigrade to 250 degrees Centigrade (at standard temperature and pressure). In some embodiments, the non-reactive diluent has a boiling point of less than 160, 200, or 240 degrees Centigrade at a pressure of one bar. In some embodiments, the non-reactive diluent has an autoignition temperature less than 300, 400, or 600 degrees Centigrade (i.e., as measured in accordance with the procedure described in ASTM E659). In some embodiments, the non-reactive diluent has a flash point of less than 50, 80, 100, or 140 degrees Centigrade as measured by the Pensky-Martens closed cup method (e.g., ASTM D93, EN ISO 2719, or IP 34).

In some embodiments, the resin has a viscosity of not more than 3500 centipoise, 3000 centipoise, or 2500 centipoise, at 40 degrees Centigrade (e.g., when measured in accordance with the procedure given in Example 3 herein).

In some embodiments, the non-reactive diluent is included in said resin in an amount of from 1 or 5 percent by weight to 10, 15 or 20 percent by weight.

Particular examples of suitable diluents include, but are not limited to: a glycol ether (e.g., dipropylene glycol monomethyl ether, dipropylene glycol dimethyl ether, dipropylene glycol methyl ether acetate, propylene glycol methyl ether, diethyleneglycol monomethyl ether, ethylene glycol ethyl ether, propylene glycol monomethyl ether, ethylene glycol monobutyl ether acetate, diethylene glycol monobutyl ether, diethylene glycol monobutyl ether acetate, diethylene glycol monoethyl ether acetate, dipropylene glycol butyl ether, etc., including combinations thereof); an ester (e.g., butyl acetate, hexyl acetate, octyl acetate, decyl acetate, dodecyl acetate, etc. including combinations thereof); an alcohol (e.g., butanol, amyl alcohol, hexanol, 1-octanol, 2-ethylhexanol, decyl alcohol, dodecanol, etc., including combinations thereof); N-methyl-2-pyrrolidone, N,N-dimethylformamide, heavy naptha, toluene, xylene, mineral spirits or white spirits, or a combination thereof; and dipropylene glycol dimethyl ether, dipropylene glycol methyl ether acetate, or a combination thereof.

The light polymerizable component may comprise monomers, prepolymers, or both monomers and prepolymers that can be polymerized by exposure to actinic radiation or light. In some embodiments, the light polymerizable component comprises reactive end groups selected from the group consisting of acrylates, methacrylates, alpha-olefins, N-vinyls, acrylamides, methacrylamides, styrenics, epoxides, thiols, 1,3-dienes, vinyl halides, acrylonitriles, vinyl esters, maleimides, and vinyl ethers.

The light polymerizable component may include a reactive blocked monomer, a reactive blocked prepolymer, or a combination thereof. For example, the light polymerizable component may include a polyisocyanate prepolymer blocked by reaction of a polyisocyanate oligomer with an amine (meth)acrylate, alcohol (meth)acrylate, maleimide, or n-vinylformamide monomer blocking agent.

The heat polymerizable component according to some embodiments may include a polyol and/or polyamine, which may be provided in liquid or solid form, including encapsulated solids or liquids, dissolved in or suspended said resin. In some embodiments, the heat polymerizable component comprises the precursors to a polyurethane, polyurea, a copolymer of a polyurethand and polyurea, a silicone resin, an epoxy resin, a cyanate ester resin, a copolymer of an epoxy and a cyanate ester resin, or a natural rubber.

The resin may further include at least one, any combination, or all, of: (v) a chain extender; (vi) a reactive diluent; (vii) a pigment or dye; and (viii) a filler.

The resin may further include an antioxidant and/or a plasticizer. Examples of antioxidants include, but are not limited to, phenols, hindered phenols, phosphites, thiosynergists, and combinations thereof (available from Mayzo, Suwanee, Ga.). Specific examples of plasticizers include, but are not limited to, phthalate plasticizers such as bis(2-ethylhexyl) phthalate (DEHP), bis(2-propylheptyl) phthalate (DPHP), diisononyl phthalate (DINP); trimellitate plasticizers such as tri-(2-ethylhexyl) trimellitate (TEHTM) (TOTM); adipate plasticizers such as bis(2-ethylhexyl) adipate (DEHA), diisononyl adipate (DINA); sebacate plasticizers such as dibutyl sebacate (DBS); maleate plasticizers such as diisobutyl maleate (DBM), etc. Examples also include naturally-derived plasticizers, for example epoxidized soybean oil (ESBO) or other epoxidized vegetable oils (e.g., cashew nut oil).

2. Additive Manufacturing.

Techniques for producing an intermediate object, or "green" intermediate, from such resins by additive manufacturing are known. Suitable techniques include bottom-up and top-down additive manufacturing, generally known as stereolithography. Such methods are known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication No. 2013/0292862 to Joyce, and US Patent Application Publication No. 2013/0295212 to Chen et al. The disclosures of these patents and applications are incorporated by reference herein in their entirety.

In some embodiments, the additive manufacturing step is carried out by one of the family of methods sometimes referred to as continuous liquid interface production (CLIP). CLIP is known and described in, for example, U.S. Pat. Nos. 9,211,678; 9,205,601; 9,216,546; and others; in J. Tumbleston et al., Continuous liquid interface production of 3D Objects, *Science* 347, 1349-1352 (2015); and in R. Janusziewcz et al., Layerless fabrication with continuous liquid interface production, *Proc. Natl. Acad. Sci. USA* 113, 11703-11708 (2016). Other examples of methods and apparatus for carrying out particular embodiments of the additive manufacturing step sometimes referred to as CLIP, and which may be used in carrying out the present invention include, but are not limited to: Batchelder et al., US Patent Application Pub. No. US 2017/0129169; Sun and Lichkus, US Patent Application Pub. No. US 2016/0288376; Willis et al., US Patent Application Pub. No. US 2015/0360419; Lin et al., US Patent Application Pub. No. US 2015/0331402; D. Castanon, US Patent Application Pub. No. US 2017/0129167. B. Feller, US Pat App. Pub. No. US 2018/0243976 (published Aug. 30, 2018); M. Panzer and J. Tumbleston, US Pat App Pub. No. US 2018/0126630 (published May 10, 2018); and K. Willis and B. Adzima, US Pat App Pub. No. US 2018/0290374 (Oct. 11, 2018).

3. Further Curing.

Once the intermediate object has been formed and optionally cleaned (e.g., by wiping, blowing, spinning, washing, etc., including combinations thereof), the object is then further cured, such as by heating. Heating may be active heating (e.g., baking in an oven, such as an electric, gas, solar oven or microwave oven, or combination thereof), or passive heating (e.g., at ambient (room) temperature). Active heating will generally be more rapid than passive heating and is typically preferred, but passive heating—such as simply maintaining the intermediate at ambient temperature for a sufficient time to effect further cure—may in some embodiments also be employed.

Inert Atmosphere and Ovens.

In some embodiments where active heating or baking is used, the objects are heated in an inert atmosphere: that is, an atmosphere containing less oxygen than air. Inert atmosphere ovens in which the oven chamber is purged with an inert gas such as nitrogen or argon are known and available from Gruenberg/Thermal Products Solutions, 2821 Old Route 15, New Columbia, Pa. 17856 USA; Despatch Thermal Processing Technology, 8860 $207^{th}$ Street, Minneapolis, Minn. 55044 USA, and others. In some embodiments, the oven can include a condenser to chill a portion of the oven atmosphere during the baking step and separate out from the oven atmosphere, by condensation, volatilized solvent (and thereby speed the volatilization of additional inert diluent from the objects being heated into the oven atmosphere). Any suitable condenser structure can be employed, such as a chilling coil in the oven chamber itself (with a liquid collector such as: a drip pan or funnel with drain operatively associated with the condenser); an assembly for removing a side-stream of gas from the oven chamber, condensing out volatilized solvent, and returning the side-stream to the oven chamber; etc. Numerous such condensation systems are known (see, for example, U.S. Pat. No. 5,220,796) and are available from oven manufacturers such as those noted above.

4. Three-Dimensional Products.

In some embodiments, three-dimensional products produced by the methods herein may include one or more repeating structural elements, including, for example, structures that are (or substantially correspond to) enclosed cavities, partially-enclosed cavities, repeating unit cells or networks of unit cells, foam cell, Kelvin foam cell or other open-cell or closed-cell foam structures, crisscross structures, overhang structures, cantilevers, microneedles, fibers, paddles, protrusions, pins, dimples, rings, tunnels, tubes, shells, panels, beams (including I-beams, U-beams, W-beams and cylindrical beams), struts, ties, channels (whether open, closed or partially enclosed), waveguides, triangular structures, tetrahedron or other pyramid shape, cube, octahedron, octagon prism, icosidodecahedron, rhombic triacontahedron or other polyhedral shapes or modules (including Kelvin minimal surface tetrakaidecahedra, prisms or other polyhedral shapes), pentagon, hexagonal, octagon and other polygon structures or prisms, polygon mesh or other three-dimensional structure. In some embodiments, the object may include combinations of any of these structures or interconnected networks of these structures. In an example embodiment, all or a portion of the structure of the 3D formed object may correspond (or substantially correspond) to one or more Bravais lattice or unit cell structures, including cubic (including simple, body-centered or face-centered), tetragonal (including simple or body-centered), monoclinic (including simple or end-centered), orthorhombic (including simple, body-centered, face-centered or end-centered), rhombohedral, hexagonal and triclinic structures. In some embodiments, the object may include shapes or surfaces that correspond (or substantially correspond) to a catenoid, helicoid, gyroid or lidinoid, other triply periodic minimal surface (TPMS), or other geometry from the associate family (or Bonnet family) or Schwarz P ("Primitive") or Schwarz D ("Diamond"), Schwarz H ("Hexagonal") or Schwarz CLP ("Crossed layers of parallels") surfaces, argyle or diamond patterns, lattice or other pattern or structure.

In some embodiments, three-dimensional products produced by the methods herein may include an array of interconnected lattice unit cells (e.g., an open cell lattice), on one or more portions thereof (e.g., a surface portion). In some embodiments, the product may include a triply periodic unit (i.e., a unit that repeats in three dimensions), such as a triply periodic surface or triply periodic minimal surface. See, e.g., U.S. Pat. No. 9,440,216 to Ryan, and U.S. Pat. No. 7,718,109 to Robb et al.

The present invention is explained in greater detail in the following non-limiting examples.

Examples 1-2

Comparative Example A

Preparation of Resins Containing Non-Reactive Solvents (and Control)

Materials used in the examples herein, their abbreviations and their sources, are given in Table 1 below.

TABLE 1

Materials

| | Components | Percentage Range (%) | Preferred Percentage Range (%) |
|---|---|---|---|
| 1 | Acrylate-blocked polyurethane [ABPU; Reaction product of HMDI (4,4'-Diisocyanato-methylenedicyclohexane), PO3G (homopolymer of 1,3-propanediol), and TBAEMA (tert-butylaminoethyl methacrylate)] | 30-90 | 50-80 |
| 2 | D608M (PEG600DMA, poly(ethylene glycol) dimethacrylate 600 MW, Green Chemical) | 0-50 | 2-20 |
| 3 | SR350DD (TMPTMA, trimethylolpropane trimethacrylate, Sartomer) | 0-20 | 0.5-5 |
| 4 | Jayflex DINA (DINA, diisononyl adipate, Exxon Mobil) | 0-40 | 1-10 |
| 5 | Irganox 245 (antioxidant, BASF Corporation) | 0.1-5 | 0.1-1 |
| 6 | SCUV-14611 White 7 Dispersion (Pigment, Wikoff Color Corporation | 0.1-1 | 0.2-0.8 |
| 7 | Proglyde DMM Glycol Diether (DMM, dipropylene glycol dimethyl ether, Dow Chemical Company) | 1-20 | 4-10 |
| 8 | diphenyl(2,4,6-trimethylbenzoyl)phosphine oxide (TPO, PL Industries) | 0.2-4 | 0.3-1.5 |
| 9 | 4,4'-methylenebis(2-methylcyclohexylamine) (MACM, DKSH) | 2-25 | 5-20 |
| 10 | Dowanol DPMA Glycol Ether (DPMA, dipropylene glycol methyl ether acetate, Dow Chemical Company) | 1-20 | 4-10 |

In a 200 mL container was added ABPU, 68.48% of PEG600DMA, Irganox 245, and TPO. After mixing for 30 minutes at 2000 rpm via a THINKY™-mixer, the remaining PEG600DMA, TMPTMA, DINA, and DMM were added. The container was mixed closed for 4 minutes via THINKY™-mixer. Pigment was added and mixed again for 4 minutes. MACM was added and mixed for 4 minutes at 2000 rpm followed by 30 seconds at 2200 rpm via THINKY™-mixer. Parts by weight of the formulation are as given in Table 2 below. Formulation 2 and Control formulation (A) were prepared similarly as the above with their corresponding components as shown in Table 2 below.

TABLE 2

| Resin Ingredients (parts by weight) | | | |
|---|---|---|---|
| Formulation: | 1 | 2 | Control |
| TPO | 0.40 | 0.40 | 0.40 |
| PEG600DMA | 10.66 | 10.66 | 10.66 |
| TMPTMA | 1.05 | 1.05 | 1.05 |
| MACM | 8.23 | 8.23 | 8.23 |
| DINA | 6.22 | 6.22 | 6.22 |
| AO | 0.10 | 0.10 | 0.10 |
| ABPU | 65.68 | 65.68 | 65.68 |
| Pigment | 0.40 | 0.40 | 0.40 |
| DMM | 7.27 | — | — |
| DPMA | — | 7.27 | — |

Example 3

Viscosity of Resin Formulations

The viscosity of the resin formulations was measured at 40 degrees Centrigrade using a Brookfield viscometer (Model DVI) equipped with an SC4-31 spindle. The bubble-free sample (9.0 g) was poured into the sample chamber and the temperature was equilibrated for 15 minutes. After equilibration, the RPM of the spindle was adjusted to target a torque of approximately 50% (RPM of roughly 3.0-1.5 depending on the sample viscosity), where the viscosity was measured. Results are given in Table 3 below.

TABLE 3

Resin Viscosity in Centipoise at 40 degrees Centigrade

| Resin | 1 | 2 | Control |
|---|---|---|---|
| Viscosity | 1985 | 2295 | 4890 |

Example 4

Properties of Objects Produced from Resin Formulations

Each resin was printed immediately after mixing on a Carbon Inc. M1 additive manufacturing apparatus (Carbon, Inc., Redwood City, Calif.) to produce 0.8 mm thick slabs. The slabs were baked as-is (no washing step) at 90° C. for 2 hours followed by 128° C. for 2 hours. Tensile samples were cut into ASTM D 412 dog-bone specimen using Die C and tested for tensile properties with 500 mm/min strain rate. Results are given in Table 4 below.

TABLE 4

Printed and Baked Resin Final Properties

| Formulation: | 1 | 2 | Control |
|---|---|---|---|
| Shore A | 80 | 80 | 80 |
| Young's Modulus (MPa) | 19 | 18 | 20 |
| Elongation at Break (%) | 335 | 332 | 306 |
| Ultimate Tensile Strength (MPa) | 24 | 23 | 25 |

It was surprising to see the final mechanical properties of parts produced from formulations 1 and 2 to be so similar to those of parts produced from the control resin, despite significant viscosity differences during printing, as well as significant loss of the solvent from the objects during the subsequent curing steps. Accordingly, there do not appear to be any disadvantages to using inert volatile solvents to enhance printability of the resin, based on the final mechanical properties of the objects produced.

Example 5

Cyclohexanone as a Non-Reactive Solvent

When the formulation of the above Examples was repeated using cyclohexanone instead of DMM, the resin viscosity rapidly increased within one hour after mixing all components and heating at 40° C. to form a gel, making it unable to successfully process/print under these conditions. This is currently believed due to chemical incompability of MACM with cyclohexanone, thus making cyclohexanone a 'reactive' diluent in this case. However, if the curative was a polyol instead of the polyamine (MACM), it is possible that cyclohexanone (and other ketones/aldehydes) can be used as a 'non-reactive' diluent.

Example 6

Additional Example Resin Formation

| | Components | Example Formulation (%) |
|---|---|---|
| 1 | Acrylate-blocked polyurethane [ABPU; Reaction product of HMDI (4,4'-Diisocyanato-methylenedicyclohexane), PO3G (homopolymer of 1,3-propanediol), and TBAEMA (tert-butylaminoethyl methacrylate)] | 65.06 |
| 2 | D608M (PEG600DMA, poly(ethylene glycol) dimethacrylate 600 MW, Green Chemical) | 10.66 |
| 3 | SR350DD (TMPTMA, trimethylolpropane trimethacrylate, Sartomer) | 1.79 |
| 4 | Jayflex DINA (DINA, diisononyl adipate, Exxon Mobil) | 7.46 |
| 5 | Irganox 245 (antioxidant, BASF Corporation) | 0.10 |
| 6 | SCUV-14611 White 7 Dispersion (Pigment, Wikoff Color Corporation | 0.4 |
| 7 | Proglyde DMM Glycol Diether (DMM, dipropylene glycol dimethyl ether, Dow Chemical Company) | 0 |
| 8 | diphenyl(2,4,6-trimethylbenzoyl)phosphine oxide (TPO, PL Industries) | 0.4 |
| 9 | 4,4'-methylenebis(2-methylcyclohexylamine) (MACM, DKSH) | 8.09 |
| 10 | Dowanol DPMA Glycol Ether (DPMA, dipropylene glycol methyl ether acetate, Dow Chemical Company) | 6.04 |

The ABPU may be composed of the following:

| | ABPU Components | Weight percentage (%) |
|---|---|---|
| 1 | HMDI (4,4'-Diisocyanato-methylenedicyclohexane) | 23.40 |
| 2 | PO3G 2000 (homopolymer of 1,3-propanediol, 2000 MW) | 40.40 |
| 3 | PO3G 1000 (homopolymer of 1,3-propanediol, 1000 MW) | 16.87 |
| 4 | TBAEMA (tert-butylaminoethyl methacrylate) | 19.32 |

The foregoing is illustrative of the present invention, and is not to be construed as limiting thereof. The invention is defined by the following claims, with equivalents of the claims to be included therein.

We claim:

1. A dual cure additive manufacturing resin, comprising:
  (i) a light polymerizable component, said light polymerizable component comprising monomers, prepolymers, or both monomers and prepolymers that can be polymerized by exposure to actinic radiation or light, said monomers, prepolymers, or monomers and prepolymers of said light polymerizable component comprising reactive end groups selected from the group consisting of acrylates, methacrylates, alpha-olefins, N-vinyls, acrylamides, methacrylamides, styrenics, epoxides, thiols, 1,3-dienes, vinyl halides, acrylonitriles, vinyl esters, maleimides, and vinyl ethers,
  (ii) a photoinitiator,
  (iii) a heat polymerizable component, wherein said heat polymerizable component comprises the precursors to a polyurethane, polyurea, a copolymer of a polyurethane and polyurea, a silicone resin, an epoxy resin, a cyanate ester resin, a copolymer of an epoxy and a cyanate ester resin, or a natural rubber, and (iv) a non-reactive diluent, wherein said non-reactive diluent has a boiling point of from 80 degrees Centigrade to 250 degrees Centigrade and is included in said resin in an amount of from 1 percent by weight to 20 percent by weight.

2. The resin of claim 1, wherein said non-reactive diluent has a boiling point of from 100 degrees Centigrade to 250 degrees Centigrade.

3. The resin of claim 1, wherein said resin has a viscosity of not more than 3500 centipoise at 40 degrees Centigrade.

4. The resin of claim 1, wherein said non-reactive diluent is included in said resin in an amount of from 5 percent by weight to 15 percent by weight.

5. The resin of claim 1, wherein said non-reactive diluent comprises a glycol ether.

6. The resin of claim 1, wherein said non-reactive diluent comprises an ester.

7. The resin of claim 1, wherein said non-reactive diluent comprises an alcohol.

8. The resin of claim 1, wherein said non-reactive diluent comprises N-methyl-2-pyrrolidone, N,N-dimethylformamide, heavy naptha, toluene, xylene, mineral spirits or white spirits, or a combination of two or more thereof.

9. The resin of claim 1, wherein said non-reactive diluent comprises dipropylene glycol dimethyl ether, dipropylene glycol methyl ether acetate, or a combination thereof.

10. The resin of claim 1, wherein said non-reactive diluent has:
(i) a boiling point less than 240 degrees Centigrade at a pressure of one bar; and/or
(ii) an autoignition temperature less than 600 degrees Centigrade; and/or
(iii) a flash point less than 140 degrees Centigrade as measured by the Pensky-Martens closed cup method.

11. The resin of claim 1, wherein said monomers, prepolymers, or monomers and prepolymers of said light polymerizable component comprise reactive end groups selected from the group consisting of acrylates and methacrylates.

12. The resin of claim 1, wherein said heat polymerizable component comprises the precursors to a polyurethane, polyurea, or a copolymer of a polyurethane and polyurea.

13. The resin of claim 1, wherein said light polymerizable component comprises a reactive blocked monomer, a reactive blocked prepolymer, or a combination thereof.

14. The resin of claim 1, wherein said light polymerizable component comprises a polyisocyanate prepolymer blocked by reaction of a polyisocyanate oligomer with an amine (meth)acrylate, alcohol (meth)acrylate, maleimide, or n-vinylformamide monomer blocking agent.

15. The resin of claim 1, wherein said heat polymerizable component comprises a polyol and/or polyamine in liquid or solid form.

16. The resin of claim 1, wherein said resin further comprises at least one, any combination, or all, of:
(v) a chain extender;
(vi) a reactive diluent;
(vii) a pigment or dye; and
(viii) a filler.

17. The resin of claim 1, wherein said resin further comprises an antioxidant.

18. The resin of claim 1, wherein said resin further comprises a plasticizer.

19. A method of making a three-dimensional (3D) object from a light polymerizable resin, comprising the steps of:
(a) providing the dual cure resin of claim 1;
(b) producing an intermediate 3D object from said resin by light polymerizing said resin in an additive manufacturing process;
(c) optionally cleaning said intermediate 3D object; and then
(d) heating said intermediate 3D object to volatilize said diluent, polymerize said heat polymerizable component, and produce said three-dimensional object.

20. The method of claim 19, wherein said producing step is carried out by bottom-up stereolithography.

21. The method of claim 19, wherein said cleaning step is included.

22. The method of claim 19, wherein said three-dimensional object produced in step (d) has: (i) a shore A hardness of at least 60; (ii) a Young's modulus of at least 15 MPa, (iii) a percent elongation at break of at least 200, (iv) an ultimate tensile strength of at least 16 MPa, or (v) any combination of the foregoing.

23. The method of claim 19, wherein said heating step is carried out with said intermediate 3D object in an inert atmosphere.

24. The method of claim 23, further comprising:
(e) concurrently with said heating step, condensing volatilized diluent out of said inert atmosphere in an amount sufficient to reduce the duration of said heating step.

25. A dual cure additive manufacturing resin, comprising:
(i) a light polymerizable component, said light polymerizable component comprising monomers, prepolymers, or both monomers and prepolymers that can be polymerized by exposure to actinic radiation or light, said monomers, prepolymers, or monomers and prepolymers of said light polymerizable component comprising reactive end groups selected from the group consisting of acrylates and methacrylates,
(ii) a photoinitiator,
(iii) a heat polymerizable component, wherein said heat polymerizable component comprises the precursors to a polyurethane, polyurea, or a copolymer of a polyurethane and polyurea, and
(iv) a non-reactive diluent, wherein said non-reactive diluent is a glycol ether and has a boiling point of from 80 degrees Centigrade to 250 degrees Centigrade and is included in said resin in an amount of from 1 percent by weight to 20 percent by weight.

26. The resin of claim 25, wherein said non-reactive diluent comprises dipropylene glycol dimethyl ether, dipropylene glycol methyl ether acetate, or a combination thereof.

27. The resin of claim 25, wherein said light polymerizable component comprises a reactive blocked monomer, a reactive blocked prepolymer, or a combination thereof.

28. The resin of claim 25, wherein said light polymerizable component comprises a polyisocyanate prepolymer blocked by reaction of a polyisocyanate oligomer with an amine (meth)acrylate, alcohol (meth)acrylate, maleimide, or n-vinylformamide monomer blocking agent.

29. The resin of claim 25, wherein said heat polymerizable component comprises a polyol and/or polyamine in liquid or solid form.

* * * * *